United States Patent [19]

Roche

[11] 4,156,891

[45] May 29, 1979

[54] EXPLOSION-PROOF EMERGENCY LIGHT

[76] Inventor: Thomas F. Roche, 21 W. Main St., Merrimac, Mass. 01860

[21] Appl. No.: 727,268

[22] Filed: Sep. 27, 1976

[51] Int. Cl.[2] .......................... F21V 19/04; F21L 7/00; H02J 7/00

[52] U.S. Cl. ........................................ 362/20; 362/254; 362/276; 362/267; 307/66

[58] Field of Search ........................ 307/22, 23, 26, 66; 240/11.2 E, 10.6 CH, 11.3; 320/DIG. 2; 340/248 Y, 253 C; 362/20, 21, 267, 254, 276, 203, 183

[56] References Cited

U.S. PATENT DOCUMENTS

| | | | |
|---|---|---|---|
| 2,702,849 | 2/1955 | Bissell | 240/11.2 E |
| 3,114,095 | 12/1963 | Palmer | 307/66 |
| 3,125,300 | 3/1964 | Roche | 362/20 |
| 3,180,980 | 4/1965 | Morrison | 362/267 |
| 3,641,336 | 2/1972 | Boin | 362/183 |
| 3,890,555 | 6/1975 | Nelson et al. | 362/183 |
| 3,976,986 | 8/1976 | Zabroski | 307/66 |

*Primary Examiner*—William M. Shoop
*Assistant Examiner*—Peter S. Wong
*Attorney, Agent, or Firm*—Weingarten, Maxham & Schurgin

[57] ABSTRACT

An explosion-proof emergency light. The emergency light includes an explosion-proof housing containing a rechargeable battery, a sealed-beam light and emergency electronics for providing a charging current for the battery and for connecting the sealed-beam light to the battery upon loss of AC line voltage. Access is provided to the interior of the explosion-proof emergency light through a circular cover containing an explosion-proof glass window through which emergency illumination is provided. The sealed-beam light is located eccentrically with respect to the glass window; and indicator lights for denoting the charge state of the rechargeable battery and the presence of AC current are mounted above the sealed-beam light, both being disposed in the cresent-shaped area formed by the aforesaid eccentric mounting, so as to be visible from the exterior of the explosion-proof emergency lamp.

3 Claims, 5 Drawing Figures

EXPLOSION-PROOF EMERGENCY LIGHT

FIELD OF THE INVENTION

This invention is related to emergency lights and more particularly to emergency lights suitable for use in an explosive atmosphere.

BACKGROUND OF THE INVENTION

The use and functioning of emergency lights for providing illumination upon loss of AC power is well known. These emergency lights are now found in interior areas which lack outside illumination and which require artificial illumination to provide for the safety of people in such areas. Many statutes and ordinances exist which require such emergency illumination in public places, such as theaters, stairwells, and elevators.

There are, however, many specialized applications in which emergency lighting would be desirable, but for which suitable emergency lighting fixtures are not available. Such applications include off-shore drilling rigs, and certain manufacturing environments where potentially explosive atmospheres may be present. Since normally emergency lights include electronic circuitry which may spark and bulbs which can break to expose a hot filament to the atmosphere, such an emergency light would not be suitable for use in explosive atmospheres. Accordingly, an explosion-proof emergency light has potentially widespread application.

SUMMARY OF THE INVENTION

The present invention provides an economical and readily manufactured explosion-proof and moisture-proof emergency light for areas in which an explosive or a potentially explosive atmosphere exists to be provided with emergency illumination upon loss of AC power for the safety of personnel and property in such areas. The invention includes a rain-proof, explosion-proof housing in which are contained a rechargeable battery for providing power for emergency illumination, a sealed-beam light, emergency light switching and recharging electronics, and indicator lights providing information as to the status of the emergency lights and electronics. Access to the interior of the emergency light is provided through a front cover having a circular glass window, through which the sealed-beam light provides emergency illumination, mounted in a threaded ring which may be screwed into the emergency light housing. The lights, battery, and electronics of the emergency unit are easily accessible by removel of the front cover. The sealed-beam light is eccentrically mounted behind the circular window defining a crescent-shaped area visible through the circular window. The indicator lights are mounted in this crescent-shaped area so as to be visible outside the housing. A test switch is provided for simulating loss of AC power to the emergency lamp for verification of emergency operation. In this manner, all the functions normally required of an emergency light are provided in an assembly particularly suited for use in an explosive atmosphere.

DESCRIPTION OF THE DRAWINGS

These and other advantages of the present invention will become evident from the following detailed description of the invention in conjunction with the accompanying drawings, of which.

DETAILED DESCRIPTION OF THE INVENTION

Figure 1:
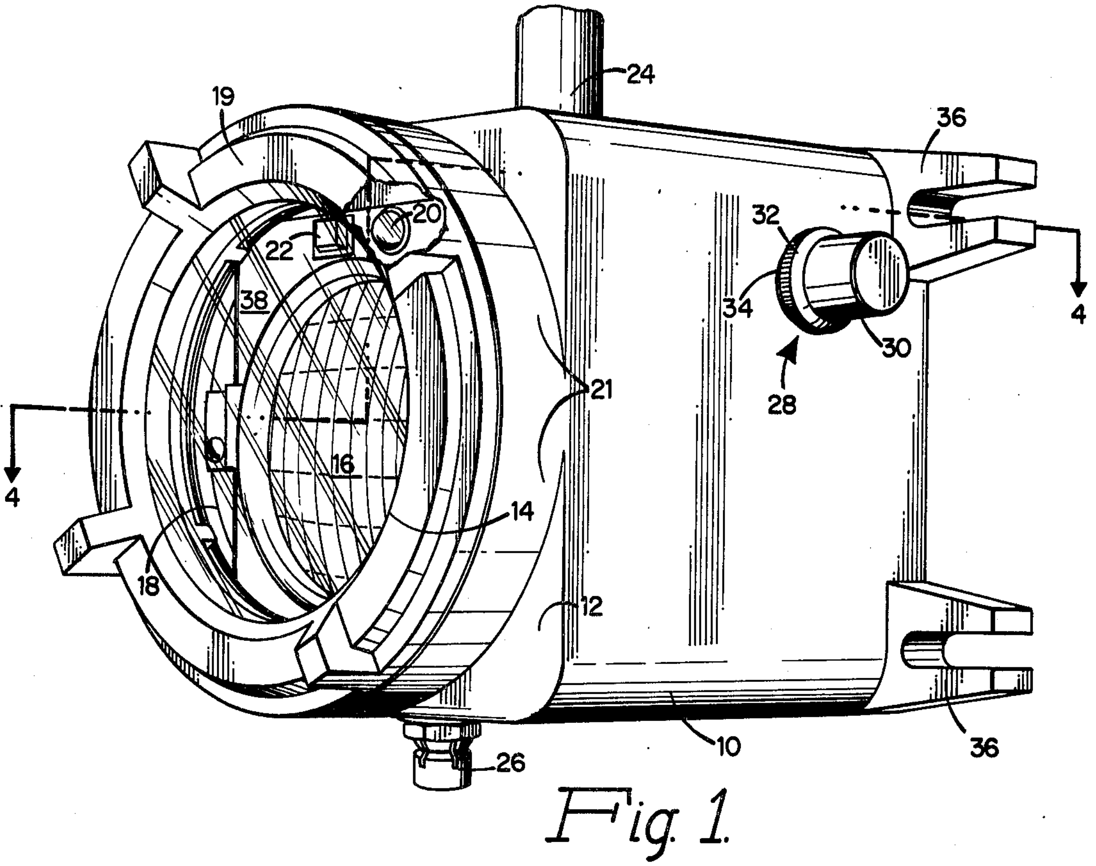
FIG. 1 is a pictorial view illustrating the external features of the explosion-proof light.
Figure 2:
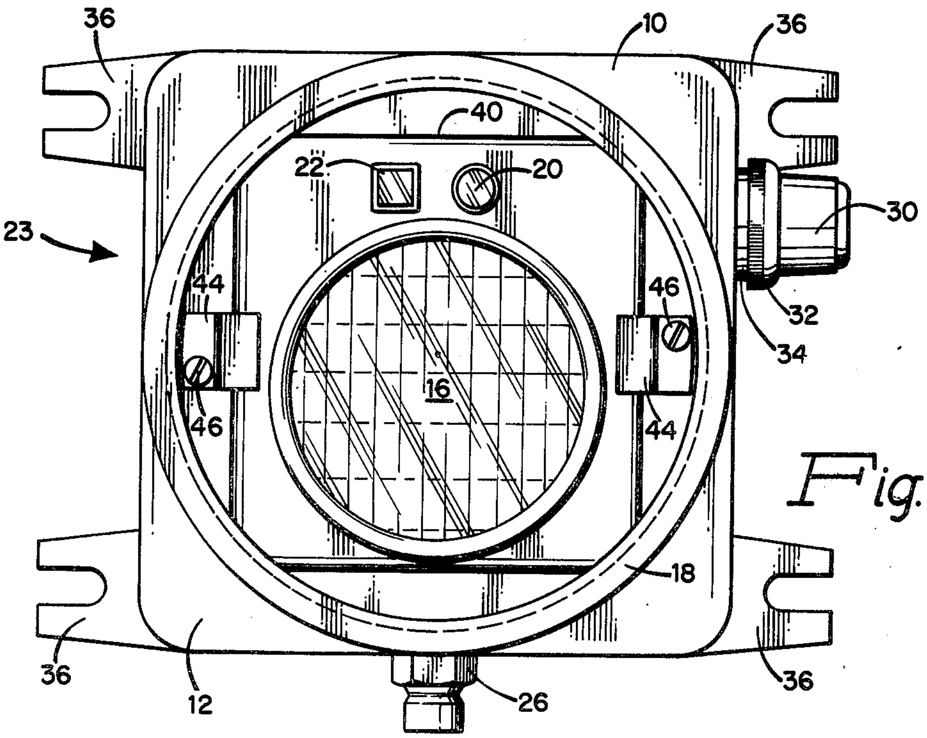
FIG. 2 is a front view of the explosion-proof emergency light showing the placement of sealed beam and indicator lamps.

A pictorial view of the explosion-proof emergency light of the present invention illustrating its general external configuration and certain novel features and advantages is set forth in FIG. 1. Generally speaking, the explosion-proof light is housed within a substantial case 10, typically formed of cast aluminum on the order of one-half inch in thickness. The embodiment shown in FIG. 1 is of a generally cubical configuration with integral side and bottom walls, however, other shapes may also be used. The front face 12 of case 10 is formed with a flange 21 having a circular, threaded opening within which cover assembly 19 may be secured. This cover assembly includes a thick explosion-proof glass plate 18 located within a circular opening 14 in cover assembly 19. Glass plate 18 is typically made of Nonex. A low voltage, circular, sealed-beam lamp 16 is spaced behind glass plate 18 and is activated by suitable circuitry, described below, to provide emergency illumination upon loss of normal AC power. The explosion-proof light may be secured to a wall or other mounting surface by means of four bolts (not shown) passing through lugs 36 which are integral with the casting forming case 10. Sealed-beam light 16 is smaller in diameter than opening 14 and is positioned behind explosion-proof glass 18 such that the center of sealed-beam light 16 is eccentrically offset from the center of opening 14. This offset results in the provision of a small but distinct crescent-shaped area 23 above sealed-beam light 16 visible through opening 14. Two indicator lights 20 and 22 are disposed into this externally visible crescent-shaped area. This can be seen more clearly in FIG. 2 which shows a front view of the explosion-proof light.

An AC pilot light 20 is located in the crescent-shaped area 23 above sealed-beam light 16, and is illuminated whenever external AC power is applied to the explosion-proof lamp. A charger assembly (discussed below) located within case 10 maintains a rechargeable battery, also located within case 10, in a fully charged state when AC power is present to provide maximum power for emergency illumination should AC power be lost. Positioned adjacent to AC pilot light 20 in this crescent area 23 is a high-charge indicator light 22. Indicator light 22 is illuminated when the internal battery is in a less than fully-charged condition and the charger assembly is providing a higher charge current to the battery than the normal trickle charge used to maintain the battery in a fully-charged condition. It is important to note that both high-charge indicator light 22 and AC pilot light 20 are located behind the explosion-proof glass 18 and within case 10 so that these lights are isolated from any possibly explosive environment in which the explosion-proof emergency light is located. Thus, AC pilot light 20 and high-charge indicator light 22 can not ignite an explosive atmosphere under any circumstances, for example, if the lens and/or bulb of one of these lights were shattered, creating sparks or exposing a hot filament to the explosive atmoshpere. Indicator lights 20 and 22 and sealed-beam light 16 form a unitary lamp head assembly 43, described in detail below, which may be quickly and easily removed as a single unit to provide access to the interior of the explosion-proof emergency light.

The AC power line conductors providing power to the explosion-proof light enter case 10 through an electrical conduit 24 extending from the top of case 10. While the interior of conduit 24 is itself isolated from the explosive atmosphere, further protection is provided by filling conduit 24 with a cement (not shown) extending for a short distance up into conduit 24 and surrounding the conductors. Extending outward from the bottom of the explosion-proof light is an explosion-proof drain and breather plug 26. The charging and discharging of certain types of rechargeable batteries providing power for emergency operation of the sealed-beam light 16 may produce gases from the battery; and means must be provided for relieving pressure and allowing such gases to escape. Also, due to temperature cycles, condensation may collect in the lowermost portions of the unit for which a drainage path must be provided. Drain and breather plug 26 is provided for these purposes. Many types of drain and breather plugs are generally available which would be suitable for use with the present invention.

Located on the side of case 10 is a test switch 28 which, when manually pressed, interrupts the AC power to the explosion-proof light. This allows testing of the battery and sealed-beam light 16 to verify the emergency operation of the light. The actual switching mechanism of test switch 28 is isolated from the external environment by a rubber boot 30 covering the switch and attached to the switch by means of a nut 32 and a gasket 34, described in greater detail below.

Thus, it can be seen that the explosion-proof emergency light of FIG. 1 provides a rugged case enclosing the necessary elements for proper operation of the emergency light and isolating these elements from any explosive external atmosphere which may exist. The case is also moisture-proof, allowing the emergency light to be used in damp environments or outside where the emergency light may be exposed to rain. A sealed-beam light provides emergency illumination through an explosion-proof glass plate, and proper operation of the emergency light may be determined by means of internal indicator lights positioned so as to be visible through the explosion-proof glass. A test switch mounted so as not to destroy the integrity of the isolation of the interior of the explosion-proof light is provided for testing and verification of proper operation of the emergency electronics used to control the light source.

Figure 3:
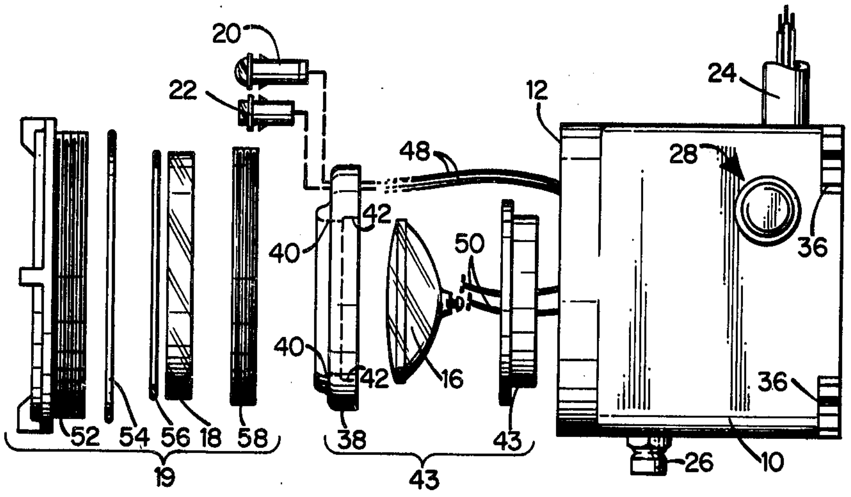
FIG. 3 is an exploded side view of the explosion-proof emergency light showing the assembly thereof.

Proper assembly procedures for the explosion-proof emergency light are important in guaranteeing the isolation between the interior of the light and the surrounding explosive atmosphere. This is explained with reference to FIG. 3, which is an exploded side view of the emergency light showing the details of the assembly of front cover assembly 19 and lamp head assembly 43.

The sealed-beam light 16 is positioned upon a lamp mounting plate 38. Lamp mounting plate 38 is formed with a circular opening 40 of a slightly smaller dimension than the circumference of sealed-beam light 16. Lamp mounting plate is further formed such that opening 40 has a shoulder 42 of slightly larger diameter; thus, sealed-beam light 16 fits within the opening provided by shoulder 42. Sealed-beam light 16 is held within lamp mounting plate 38 by a mounting bracket 43 attached to lamp mounting plate 38 by means of several mounting screws (not shown). This may be more clearly seen with reference to FIG. 4 which is a sectional view through the explosion-proof light along the plane 4—4 of FIG. 1. AC pilot light 20 and high-charge indicator light 22 are mounted within holes located in lamp mounting plate 38. Lamp head assembly 43 is mounted by attaching mounting plate 38 to case 10 by a pair of clamps 44 which are bolted on to the front face 12 of case 10. Prior to attaching lamp head assembly 43 to case 10, the indicator lights 20 and 22 are connected to the charger electronic circuitry by means of wires 48, and sealed-beam light 16 is similarly connected to the charger by means of wires 50.

Figure 4:
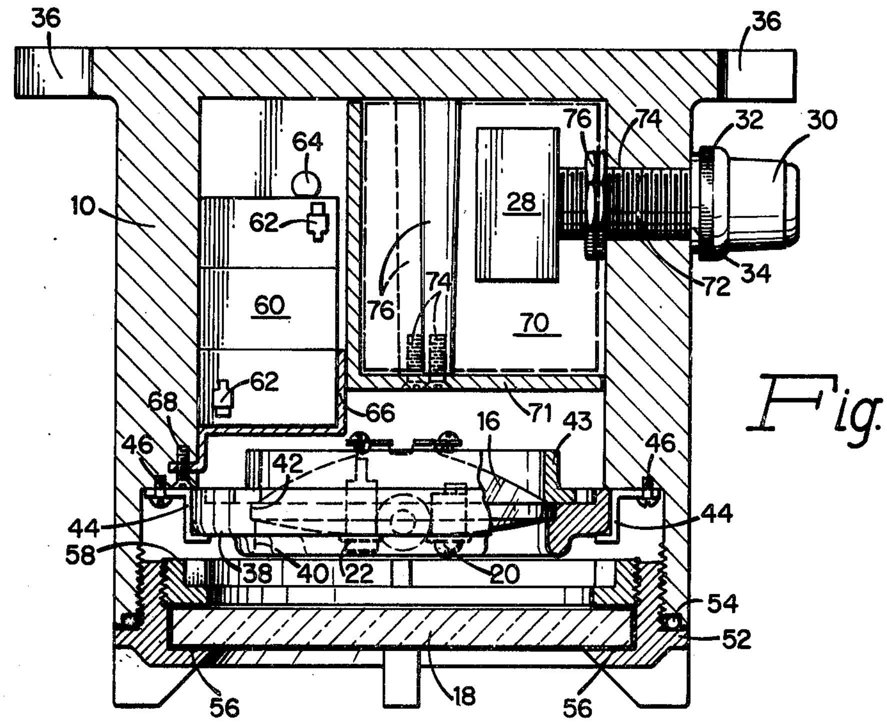
FIG. 4 is a top cross-sectional view of the explosion-proof light taken along the section line 4—4 of FIG. 1.

After mounting the lamp head assembly, the cover assembly 19 is put into place. The cover assembly is mounted by threading a cover ring into corresponding threads in flange 21. An O-ring 54 is located between cover ring 52 and flange 21, as shown in FIG. 4, to make a moisture-proof seal between the cover assembly 19 and the case 10 of the explosion-proof light. The explosion-proof glass plate 18 is located within a corresponding opening formed in cover ring 52. A circular ring of silicone cement 56 is applied around the circumference of the front surface of glass plate 18 to provide a moisture-proof seal between glass plate 18 and cover ring 52. Glass plate 18 is held in place in cover ring 52 by means of a threaded retainer ring 58 which is screwed into corresponding threads in cover ring 52 to securely mount explosion-proof glass 18, as shown in FIG. 4.

It should be evident that access to sealed-beam light 16 and the interior of the explosion-proof light is quickly and easily accomplished by unscrewing cover ring 52 and removing cover assembly 19 as a unit. Removal of bolts 46 allows lamp head assembly 43 to then be easily removed providing access to the interior of case 10 and the emergency light electronic circuitry contained therein.

The arrangement of the battery and charger assembly inside the explosion-proof lamp is not critical, but one suitable arrangement is shown in FIG. 4. Note that the wires which electrically interconnect the various components have been omitted from FIG. 4 for clarity. The circuit connections are shown clearly in FIG. 5. A generally rectangular, rechargeable battery 60 provides power for the emergency light when AC power is lost. Battery 60 has spade lug terminals 62 to allow the battery 60 to be quickly and easily disconnected from the emergency lamp electronics for testing or replacement. Battery 60 is located adjacent to a side wall of case 10 and a locating post 64, and is held in place by means of a bracket 66 which is securely fastened to case 10 by bolts 68 or other means. A charger assembly 70, which is typically rectangular in shape, is positioned as shown in FIG. 4 and is held within the explosion-proof body by means of two screws threaded into blind holes in the bottom of the cast aluminum body (not shown). A cover 71 to the charger assembly 72 is held onto the charger assembly by screws 74 which protrude through the cover into two locating posts 76. The cover 72 prevents any wires or other internal mechanism in charger assembly 70 from touching the side of the aluminum casting, should the bottom fastener screws be broken.

Extending into the interior of case 10 above charger assembly 70 is an explosion-proof test switch 28. A threaded mounting bushing 72 of test switch 28 is threaded into a corresponding threaded hole 74 in the side of case 10. Nut 32, which is integrally formed with and attached to rubber boot 30, and a second nut 76 are threaded onto bushing 72 and tightened to securely hold test switch 28 within hole 74. Rubber gasket 34 is provided beneath nut 32 to provide a moisture-proof seal around test switch 28 in conjunction with rubber boot 30.

Figure 5:
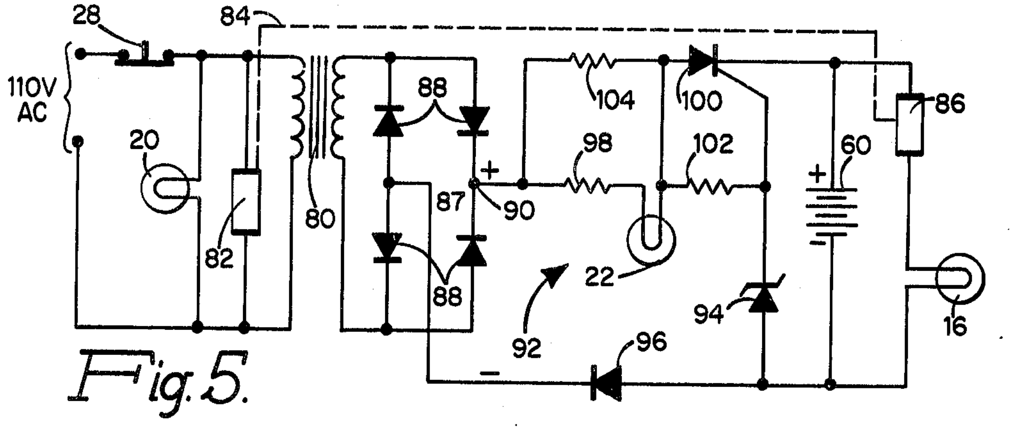
FIG. 5 is a schematic diagram of electronics suitable for use with the present invention.

Electronic circuitry to provide the necessary charging and switching functions required by the novel explosion-proof emergency lamp is well known to those in the art, and FIG. 5 shows one embodiment of such circuitry suitable for use with the present invention. AC power is provided to the primary winding of a step-down transformer 80 which provides a lower voltage suitable for charging battery 60 at its secondary winding output. Normally-closed test switch 28 is connected in series with the source of AC power for testing the emergency operation of the explosion-proof light. AC pilot light 20 is connected across the input to transformer 80 to provide an indication that AC power is being applied to the charging circuitry. The input circuitry 82 of a solid-state relay 84 is also connected across the primary of transformer 80 and controls the switching circuitry 86 in solid-state relay 84. Switching circuitry 86 is normally open when AC power is applied to circuitry 82, and upon loss of AC power, switching circuitry 86 closes applying power from battery 60 to sealed-beam light 16 to provide emergency illumination.

The low voltage output from transformer 80 is applied to a full-wave rectifier circuit 87, composed of diodes 88, to provide a DC output. Connected between the positive output 90 of the full-wave rectifier and battery 60 is circuitry 92 which controls the charging current to battery 60. A diode 94 is provided between the negative output from the full-wave rectifier 87 and the negative terminal of battery 60 to prevent inadvertent damage to either the rectifier or the battery in the event that battery 60 is inadvertently connected into the circuitry with reverse polarity.

Charging circuitry 92 operates in the following manner. The positive voltage terminal of rectifier 87 is connected to the positive terminal of battery 60 via current limiting resistor 98, high charge indicator light 22, and silicon-controlled rectifier (SCR) 100. A zener diode 94 provides a set reference voltage to control the charging current to keep the battery in a fully charged condition. Resistor 102 is of a relatively high resistance and serves to provide a path for current to zener 94. When the voltage from battery 60 falls below the desired level, SCR 100 is turned on and a charging current flows through indicator lamp 22 illuminating it and charges battery 60. A shunt resistor 104 is provided in parallel with current limiting resistor 98 and high-charge indicator light 22 to insure that indicator light 22 is extinguished when the charging current drops to a low level.

The novel explosion-proof emergency lamp described above is constructed in such a manner that all required electronics, switches, and indicators are contained within an explosion-proof housing. A test switch is provided to verify the operation of the emergency lamp electronics and to test the explosion-proof integrity of the emergency light case. All of the active elements of the light, including battery, charging and switching electronics, emergency light source, and indicator lights, are entirely enclosed by the explosion-proof pacakge, yet means are provided for venting and for test. Total visibility of indicator lights has been provided without diminishing the explosion-proof integrity of the unit.

Various modifications and additions which do not fall beyond the scope of the present invention will occur to those of ordinary skill in the art in applying the teachings of the invention to different applications. Accordingly, the present invention is to be limited only as indicated in the appended claims.

What is claimed is:

1. An explosion-proof emergency light comprising: an explosion-proof housing, the interior thereof being isolated from the surrounding environment and a section thereof being light-transmissive for providing emergency illumination therethrough;

the light-transmissive section of said housing including a circularly-shaped, transparent, explosion-proof window;

means for providing AC line voltage to the interior of said housing without breaching the explosion-proof isolation of the housing interior;

a rechargeable battery;

means for providing a charging current to said battery in response to the presence of AC line voltage;

a circular sealed-beam light for providing emergency illumination;

means for electrically connecting said light to said battery in response to a loss of AC line voltage;

indicator means including a first indicator light for providing an indication of the charge state of said battery;

the sealed-beam light being disposed behind the explosion-proof window and eccentric thereto to provide a crescent-shaped area, behind said window and visible therethrough, formed by the eccentric relationship of the sealed-beam light and the explosion-proof window;

the indicator light being mounted in said crescent-shaped area behind said explosion-proof window so as to be visible therethrough;

a unitary removable assembly including:

a mounting plate having a circular opening therein offset from the center thereof and adapted to receive said sealed-beam light;

a circular retaining ring cooperative with said mounting plate for holding said sealed-beam light within said circular opening;

means for securing said retaining ring to said mounting plate;

means for securing said mounting plate within said explosion-proof housing immediately behind said window so that the sealed-beam light is eccentrically positioned with respect to said window;

means for mounting said battery and said charger within the explosion-proof housing behind said mounting plate;

said mounting plate having a hole for receiving and holding said indicator light, the hole being located in the mounting plate opposite the direction that said circular opening is offset from the center of said mounting plate so that the indicator light is located in said crescent-shaped area;

said mounting plate being of a dimension smaller than the diameter of said circular opening in the explosion-proof housing so that the mounting plate, retaining ring, sealed-beam light, and indicator light may be removed as an assembly to permit access to the battery and charger located within said explosion-proof housing; and said battery, charging means, light, connecting means and indicator light being completely contained within said explosion-proof housing to provide isolation from the environment surrounding the explosion-proof emergency lamp.

2. The explosion-proof emergency light of claim 1 wherein the removable assembly includes:

a circular, threaded ring, the explosion-proof window being mounted therein;

and wherein the explosion-proof housing includes a correspondingly-threaded circular opening into which the circular ring may be threaded.

3. The explosion-proof emergency light of claim 2 wherein said indicator means includes:

a second indicator light positioned adjacent to said first indicator light for providing a signal indicative of the presence of AC line voltage;

explosion-proof vent means connected to the lower portion of said housing for venting moisture from the interior of said housing;

a test switch for interrupting the AC line voltage to the explosion-proof light for testing thereof; and means for mounting said test switch to preserve the explosion-proof isolation of the interior of said housing.

* * * * *